(12) United States Patent
Bayer et al.

(10) Patent No.: US 7,818,459 B2
(45) Date of Patent: Oct. 19, 2010

(54) VIRTUALIZATION OF I/O ADAPTER RESOURCES

(75) Inventors: Gerd Konrad Bayer, Stuttgart (DE); Wolfgang Eckert, Altdorf (DE); Markus Michael Helms, Boeblingen (DE); Juergen Maergner, Sindelfingen (DE); Christoph Raisch, Gerlingen (DE); Thomas Schlipf, Holzgerlingen (DE); Klaus Theurich, Gechingen (DE)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/931,732

(22) Filed: Oct. 31, 2007

(65) Prior Publication Data

US 2008/0120442 A1  May 22, 2008

Related U.S. Application Data

(63) Continuation of application No. 09/683,275, filed on Dec. 6, 2001, now Pat. No. 7,337,240.

(30) Foreign Application Priority Data

Dec. 15, 2000  (EP) .................................. 00127579

(51) Int. Cl.
G06F 15/16  (2006.01)
(52) U.S. Cl. ...................................... 709/250; 709/200
(58) Field of Classification Search ................ 709/200, 709/202–203, 250, 220–223; 711/100–101, 711/118, 135, 200, 206; 710/52
See application file for complete search history.

(56) References Cited

U.S. PATENT DOCUMENTS

| 5,659,690 A | 8/1997 | Stuber et al. |
|---|---|---|
| 5,664,150 A | 9/1997 | Isaac et al. |
| 5,671,355 A | 9/1997 | Collins |
| 6,112,252 A | 8/2000 | Hausman et al. |
| 6,247,071 B1 * | 6/2001 | Cardoso, Jr. ................. 710/52 |
| 6,564,271 B2 | 5/2003 | Micalizzi et al. |
| 6,594,712 B1 | 7/2003 | Pettey et al. |

(Continued)

FOREIGN PATENT DOCUMENTS

EP        0772131        5/1997

(Continued)

OTHER PUBLICATIONS

Microsoft Computer Dictionary, Fifth Edition, 2002, p. 81, definition.

(Continued)

*Primary Examiner*—Nathan Flynn
*Assistant Examiner*—Joshua Joo
(74) *Attorney, Agent, or Firm*—Ference & Associates LLC

(57) ABSTRACT

A method and apparatus relates to hardware-to-hardware data transmission in computer systems, and in particular, it relates to method and system for operating I/O adapters attaching either one or more computing devices to an I/O periphery, to a network, or to other computing devices. It is proposed to operate a memory local to the network coupling adapter as a cache memory relative to a system memory associated with the one or more computing devices for storing transmission control information.

16 Claims, 5 Drawing Sheets

U.S. PATENT DOCUMENTS

| | | | |
|---|---|---|---|
| 6,744,765 B1 | 6/2004 | Dearth et al. | |
| 6,801,927 B1 * | 10/2004 | Smith et al. | 709/202 |
| 6,807,581 B1 | 10/2004 | Starr et al. | |
| 6,810,440 B2 | 10/2004 | Micalizzi et al. | |
| 6,859,867 B1 * | 2/2005 | Berry | 711/206 |
| 7,350,028 B2 * | 3/2008 | Cameron et al. | 711/135 |
| 2002/0071450 A1 * | 6/2002 | Gasbarro et al. | 370/463 |

FOREIGN PATENT DOCUMENTS

| | | |
|---|---|---|
| EP | 0789302 | 8/1997 |
| EP | 1006449 | 6/2000 |
| WO | 99/03044 | 1/1999 |

OTHER PUBLICATIONS

PCI to Infiniband Bridge Target Channel Adapter, Jun. 29, 2000, Anonymous, Retrieved from Internet, www.sun.com/io$_{13}$technologies/docs/.

European Seach Report dated Jan. 11, 2006, for Application No. EP 01 12 8821.

* cited by examiner

--PRIOR ART--

VIRTUALIZATION OF I/O ADAPTER RESOURCES

CROSS-REFERENCE TO RELATED APPLICATIONS

This application is a continuation application of U.S. patent application Ser. No. 09/683,275 filed on Dec. 6, 2001, now U.S. Pat. No. 7,337,240 the contents of which are hereby incorporated by reference in its entirety.

BACKGROUND OF INVENTION

1. Field of the Invention

The subject invention relates to hardware-to-hardware data transmission in computer systems. In particular, it relates to method and system for operating I/O adapters attaching computing devices either to an I/O periphery, a network, or other computing devices.

2. Description and Disadvantages of Prior Art

The area of the invention concerns hardware of computer systems and network components. It deals more particularly with a method to improve the performance of I/O adapters and utilisation of adapter-local resources like memory.

As revealed by a first publication of the InfiniBand Architecture (IBA), the prior art of interconnect technologies have failed to keep pace with the current computer evolution and the increased burden imposed on data servers, application processing and enterprise computing created by the popular success of the Internet.

High end computing concepts such as clustering, fail-safe operations, and 24×7 hour availability demand greater capacity to move data between processing nodes as well as between a processor node and I/O devices. These trends require higher bandwidths and lower latencies, they are pushing more functionality down to the I/O adapters, and they are demanding greater protection, higher isolation, deterministic behavior, and a higher quality of service then it is currently available. InfiniBand helps to achieve the above mentioned aims.

The invention can be advantageously applied with this new InfiniBand technology and thus increases speed of technical evolution.

Although the invention has a quite general scope it will be discussed and set out with reference to a specific prior art hardware-to-hardware data transmission in computer systems. This is a communication between a CPU subsystem 8 and a host adapter 18, as depicted in FIG. 1 and explained next below.

Today's computer systems (hosts) have a "dense-packed" CPU-memory-subsystem 8 comprising a plurality of CPUs with caches 10, system memory 12, memory controller 14, interconnect logic, etc. Input/output devices, further referred to herein as I/O devices 16 like storage devices, communication networking devices, inter-system connections, etc. are attached via a so-called I/O or host adapter 18. The host adapter 18 may be connected with some "distance" in terms of access time to the CPU-memory subsystem.

Applications running in the CPUs use specific communication protocols for their connections to said I/O devices 16 and other computer systems accessible via a network.

These protocols, as for example InfiniBand mentioned above, may define that the application can post work requests to the system memory and is enabled to signal the host adapter to process these work requests. This requires, however, that for signaling and control purposes some amount of information has to be transferred from the CPU-memory-subsystem 8 to the host adapter 18. There are protocols which define very complex tasks for the host adapter to execute in order to perform said processing of the work requests. As it is apparent to a person skilled in the art, a multiple queue processing system is used for processing various incoming requests, in-/outbound data traffic associated with work queues, and system control queues.

In prior art there have been two different types of methods to cope with this problem:

With the first type of methods, the I/O adapter 18 is equipped with local memory 20, e.g. implemented on-chip or as separate SRAM/DRAM on card or board. The required control information of the posted work requests is stored in this local memory. During processing, the host adapter 18 has fast access to the required information. This approach performs very well, but there are resource restrictions, for example the relatively small maximum number of postable work requests which prevents this prior art approach from scaling up to larger environments. This is primarily due to size limitations of the local memory 20. A simple up-scaling of the local memory is expensive as it costs too much (e.g. chip area costs or SRAM/DRAM module costs).

With the second type of methods, the I/O adapter is not equipped with local memory. Instead, it contains a small set of registers in logic to hold the required control information of one or more work requests. Processing work requests requires many accesses to system memory. This approach is optimized for cost but would not perform well although it does not imply the resource restrictions of method 1. This approach would be a significant obstacle for implementing a well performing, fabric-based switching technology such as InfiniBand.

It is thus an objective of the invention to overcome the performance/resource restriction problems as outlined above while concurrently being compatible with the switching technology in general.

SUMMARY OF INVENTION

These objects of the invention are achieved by the features stated in enclosed independent claims to which reference should now be made. Further advantageous arrangements and embodiments of the invention are set forth in the respective subclaims.

According to a primary aspect of the invention a method for improving the performance of a network coupling adapter is disclosed which attaches one or more computing devices via an interconnected memory, to either one of an I/O periphery, a network, or other computing devices. The method is then characterized by the steps of: operating a local memory being associated with the network coupling adapter as a cache memory relative to a system memory, called an interconnected memory, associated with one or more computing for storing transmission control information.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION

Figure 1:
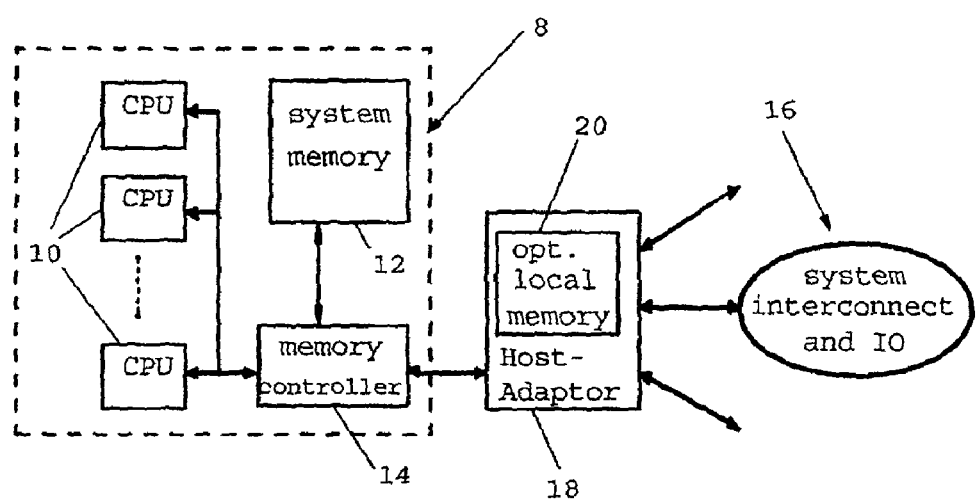
FIG. 1 is a schematic block diagram showing the structural elements in a prior art computer system being equipped with a host adapter.

The embodiment described next is directed to a design for a transport layer logic of an I/O adapter, i.e., a so-called Host Channel Adapter (HCA) as defined by the InfiniBand Architecture.

The term network and network coupling adapter is to be understood in a very general sense: The network can be for example a Wide Area Network (WAN), a Local Area Network (LAN), or even backplane bus within a PC where the bus participants are interpreted as network attached elements. The term network coupling adapter is thus any hardware device in such hardware structure which interconnects network components.

Said hardware structures include explicitly so-called fabric structures as well as a replacement technology of any kind of conventional bus technology. The expression "fabric" has the general meaning of 'configuration'. More particularly it is used herein as defined in the Fibre-Channel or the Infiniband Standards.

Thus, in terms of network topology, it can be considered as an 'agglomeration, i.e., a 'cloud'-like structure of point-to-point connections', in which the bandwidth availability is less restricted compared to conventional bus technology, for example.

As a primary advantage the option is provided to offer a variable number of communication channels without the provision of a large local memory with a fixed size and performance in the network coupling means itself. Thus, the performance of said network coupling means can be easily scaled up according to dynamically changing traffic load without adding large amount of fast and expensive SRAM/DRAM area locally into said device. Thus, the traffic load flexibility is increased significantly.

The above inventional concept can be advantageously used with InfiniBand technology because a modern industry standard is defined therewith which allows to apply said fabric-based concept in the whole range of applications as it was sketched out above.

When the transmission control comprises the processing of address translation, e.g., logical to physical and vice versa- and protection information, e.g., tables then prior art remote processes can be advantageously performed.

When used for connecting a plurality of I/O devices associated with one or more computing devices as described above, the entire I/O periphery can be controlled with less restrictions and better performance according to the invention.

When said transmission control information is bundled per queue or queue pair then the number of cache line transfers to said interconnected memory means for a queue work request is reduced which increases performance and saves bandwidth.

Said cache memory can be configured for special queues not to discard transmission control information after cast out, i.e., after copying said control information back to the main memory. Subsequent repeated cast-in operations can be avoided if the cache line has not been re-used for other control information. A reduced number of cast-in operations and reduced latency improve the processing of queue pairs.

When writing said transmission control information to the local memory only before signaling the completion of a InfiniBand verb, then bandwidth is saved as well.

The inventional method can even be used for providing interprocess communication (IPC) between a plurality of processes associated with one or more computing devices, independent of the underlying hardware structure of the network.

Furthermore it can be advantageously combined with the InfiniBand Architecture specification which was recently published. Amongst the general understanding of a person skilled in the art the following terms are thus used with additional—but not restricted to—particular reference to the InfiniBand Architecture specification, as it was recently published: "Adapters" in the sense of Host Channel Adapters (HCA) or Target Channel Adapters (TCA), "network" including a fabric, or "verbs" which provide an abstract definition of the functionality provided to a host by a Host Channel Interface (HCI).

The basic idea of the invention is, to use system memory as well as host adapter local memory for the transmission control information. The local memory is used like a cache, the system memory hold those work requests, which do not fit into the cache. This allows to provide the performance of implementing local memory only, but overcomes the resource restrictions of the local-memory-only approach.

The InfiniBand Architecture is designed around a point-to-point, switched I/O fabric, whereby end-node devices (which can range from very inexpensive I/O devices like single chip SCSI or Ethernets to very complex host computers) are interconnected by cascaded switch devices.

The invention provides a general means for improving prior art hardware-to-hardware data transmission on a very large range of scales: the invention can thus be advantageously applied to improve data traffic in pure, dedicated network devices like switches and routers, and furthermore, it can be well applied within LAN/WAN-based interprocess communication. The invention"s basic concept is open to integrate any prior art network technology and in particular it can be advantageously applied to techniques such as Ethernet or Fibre Channel.

Thus, according to the invention any hardware-based data transmission like a module-to-module interconnection, as it is typified by computer systems that support I/O module add-in slots or chassis-to-chassis interconnections as they are typified by interconnecting computers, external storage systems or even external LAN/WAN access devices, such as switches, hubs and routers in a data-center environment can be advantageously supported by the invention's concepts.

Figure 2:
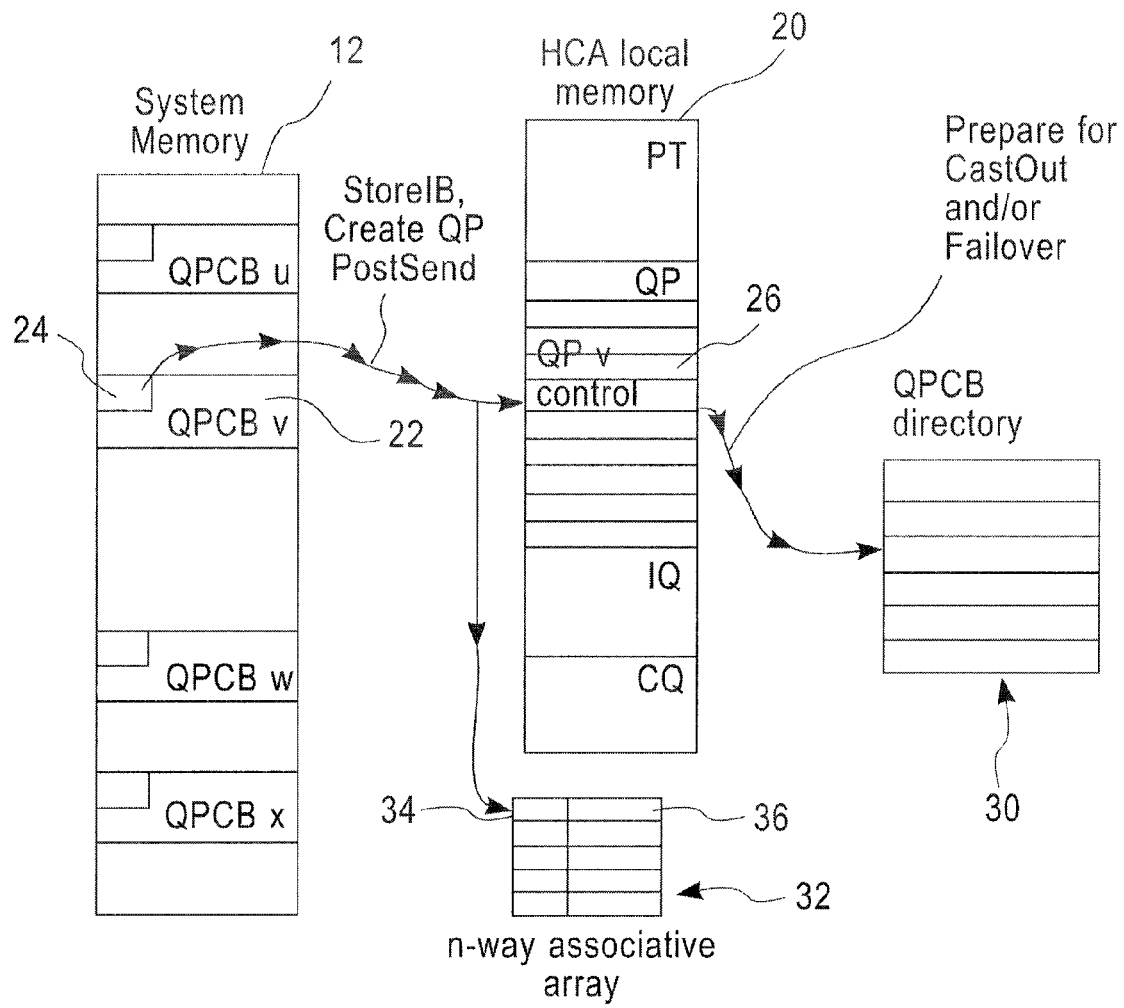
FIG. 2 is a schematic block diagram showing the basic structure of an inventional method for caching queue pairs in a first operating state.

In FIG. 2 the system memory 12—depicted left—has a plurality of entries 22 for storing the work request related control information for a particular work queue in a queue pair control block 22, further abbreviated as QPCB, each entry comprising a storage field 24 for storing the control information for it. Other queues are managed in here as well, these are, however not depicted in order to improve clarity.

Among others, the QPCB 22 comprises the following basic data:—queue pair state information—sequence numbers—maximum transfer unit size—destination LID (Local Identifier of connected queue pair)—destination GID (Global Identifier of connected queue pair)—error counters—performance countersAmong others the control field 24 comprises the following basic data:—send and receive queue head and tail pointers—number of associated completion queues—depth of send and receive queuesIn the host adapter memory 20 several transmission control blocks, e.g., a protection table PT, the work request queue WQ, with the queue pairs QP, an interrupt queue IQ, and a complete queue CQ, are managed. For each queue a plurality of cache entries 26 is provided for receiving the queue pair ID, i.e., a unique number and the respective control information required for the connecting host adapter to do its job, i.e., route the requested data to the correct network element or I/O device, respectively.

Further, a n-way associative array 32 is provided for storing the queue pair number 34 with the local address 36 in the cache storage 20, like it corresponds to usual caching techniques. Further, a QPCB directory 30 is provided for storing the queue pair number with the address of the system memory 12, in order to enable for casting out an entry from the cache memory 20 back into the system memory 12, when required.

Figure 3:
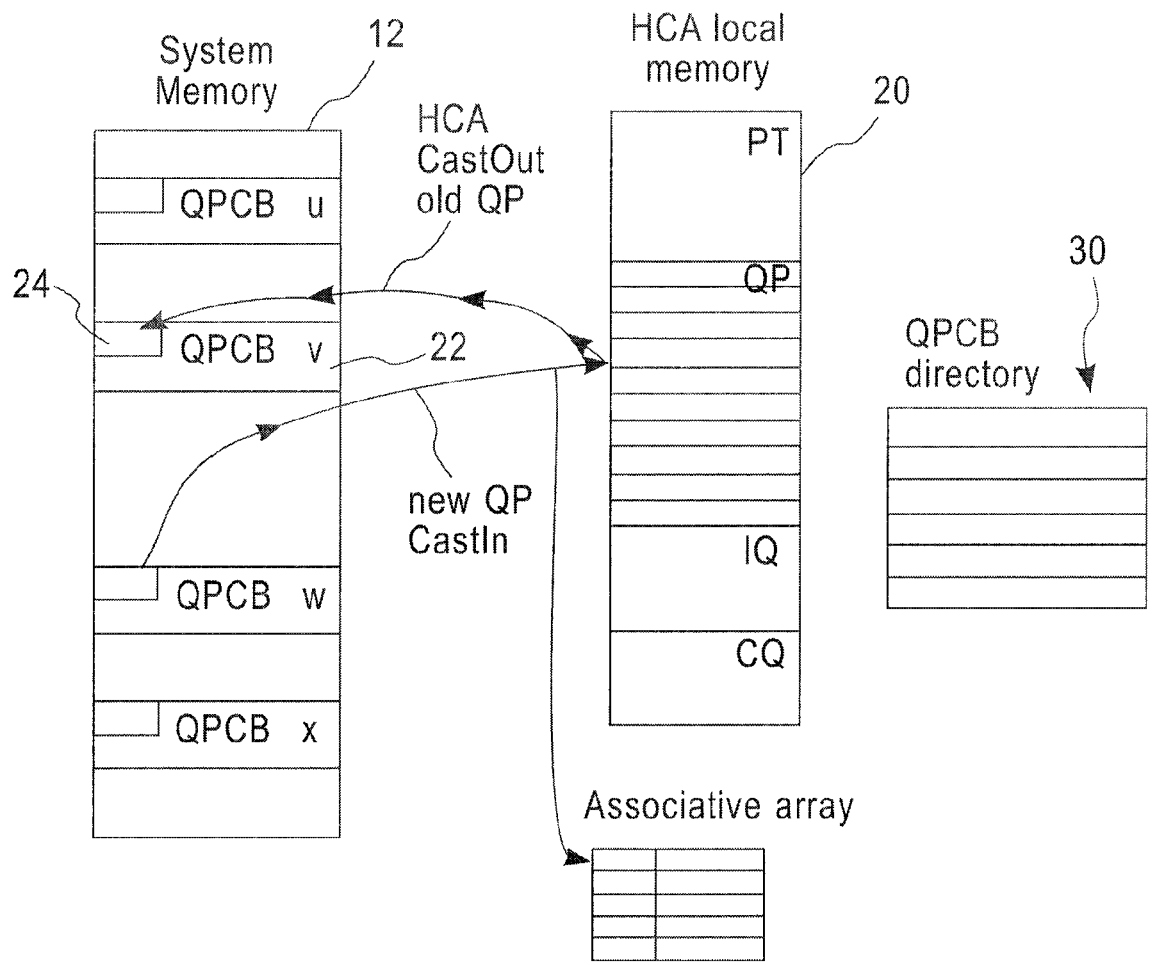
FIG. 3 is a schematic block diagram according to FIG. 2 in a second operating state different to that one shown in FIG. 2.

In FIG. 2 enough local memory space is available in the QP area. During operation of the caching mechanism a situation emerges in which there is no free entry in said storage area for the queue pairs. This is depicted in FIG. 3 which has basically the same structure as described above with reference to FIG. 2.

Figure 4A:
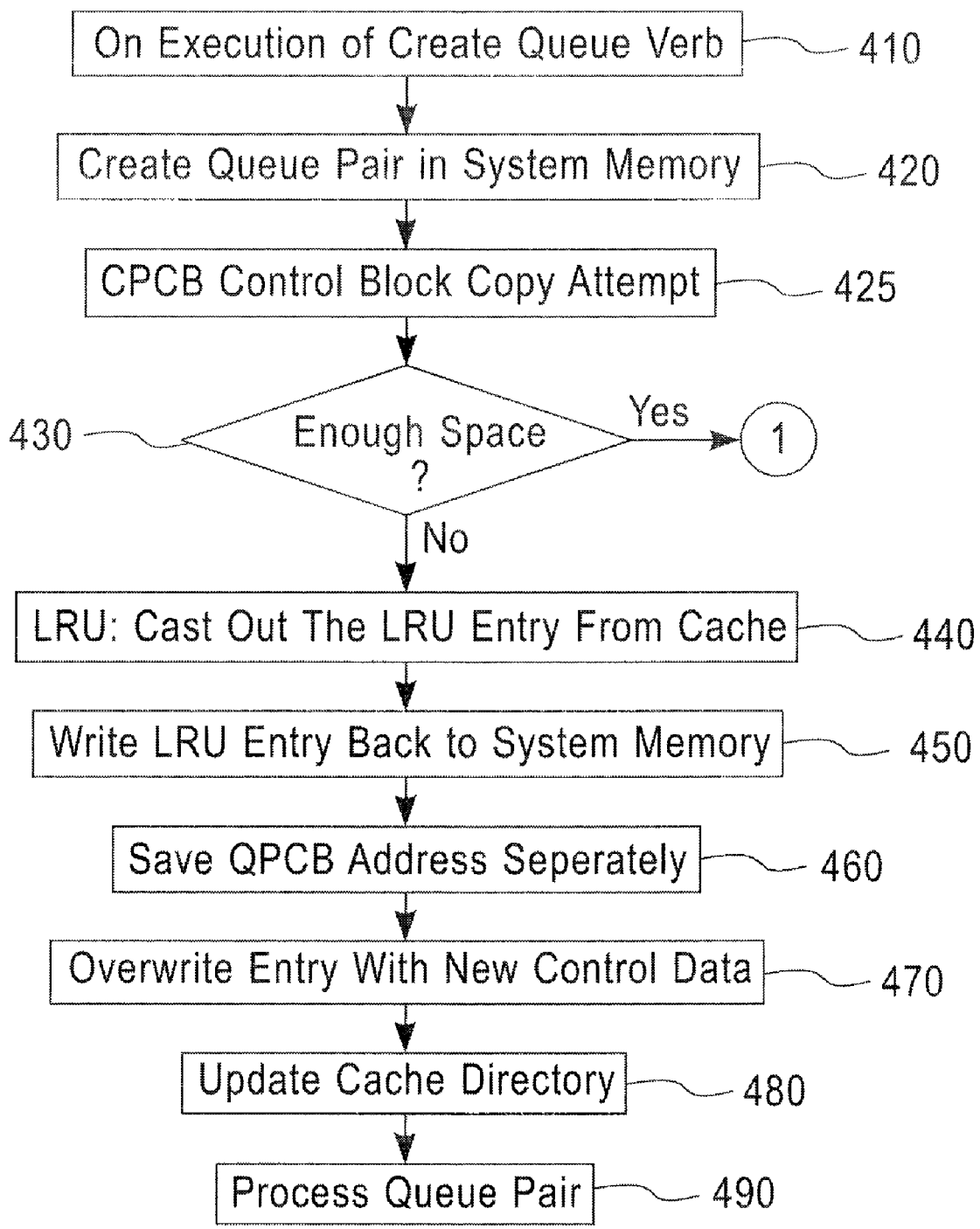
FIGS. 4A and 4B are a schematic diagram showing the basic steps of the associated control flow according to the inventional embodiment shown in FIGS. 2 and 3.
Figure 4B:
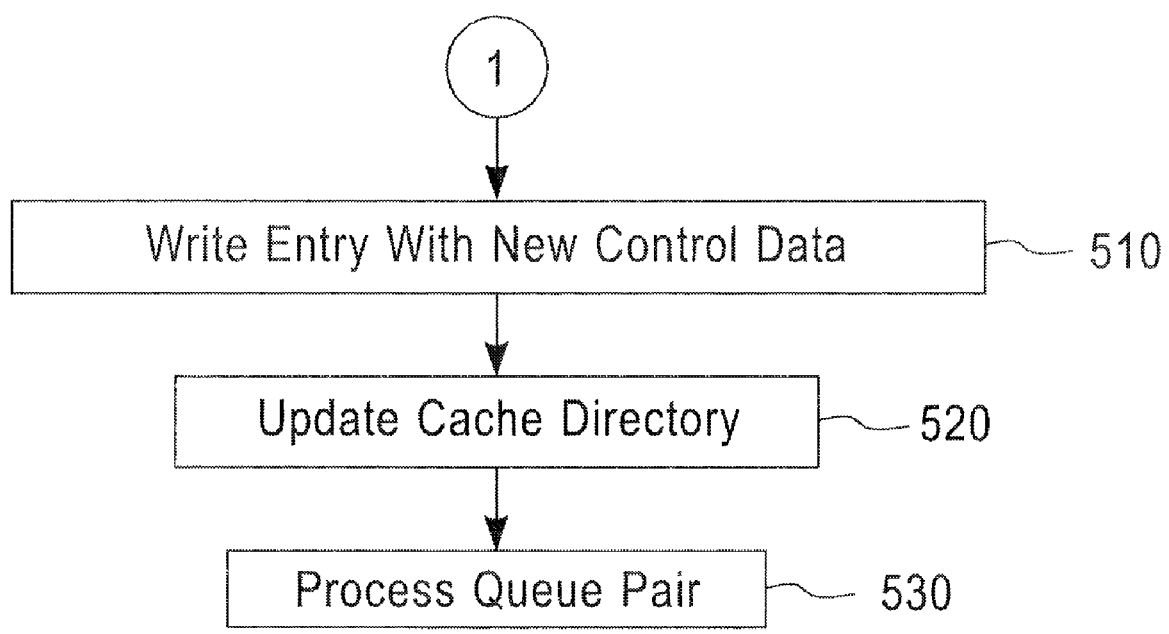

With general reference to the figures and with special reference now to FIG. 4 A and B, the operation of the proposed caching technique will be described in more detail with a sample queue pair as it is defined in the InfiniBand Architecture: a send queue and a receive queue. It should be noted that any other queues required for compatibility with the Infiniband Architecture, for example, or with other protocols can be managed according to the same principle.

On execution of a CreateQueue verb, e.g., when a queue pair shall be created, step 410, this is initiated by the CPU-memory-subsystem 8 in FIG. 1. The respective application which originates the queue pair generation thus triggers that a queue pair control block (QPCB) is built in the system memory 12, step 420.

Then the host adapter"s cache memory gets a request for storing caching data for the queue pair, i.e., the host adapter 18 gets a door bell signal indicating that the control area 24 of the new control block has to be copied, step 425 to the host adapter. A control logic decides, step 430, if enough free storage space is available in the cache memory. If not, see the NO-branch 430 of FIG. 4A, then a classical cast-out/cast-in process takes place: In this situation now the host adapter checks the available storage space and detects that the local cache memory 20 is out of free space. Thus, in a next step 440 one particular queue pair, i.e., only its control information, is cast-out from the local cache memory according to an algorithm, like for example used in conventional caching techniques where for example the least recently used cache entry is overwritten (LRU algorithm). Thus, this entry is written back into system memory, step 450, and the address of the QPCB 22 is saved in the QPCB directory 30, step 460.

Then, in a next step 470 the host adapter 18 writes the new queue pair control block into the respective storage location, for example by simply overwriting the former contents of it.

Finally, the cache directory 32 is updated again, step 480. Then, the host adapter 18 is enabled to process the new queue pair, step 490.

When enough space is available in the local cache memory, see the YES-branch of decision 430, then the sequence of steps for cast-in/cast-out is not required. Instead, see FIG. 4B now, the respective control information is copied from the system memory 12 to the local memory 20 of the host adapter 18, step 510. Thus, only a small fraction of the queue pair data amount, i.e. only the control information is stored in the local cache memory 20.

Further, said cache directory 32 is updated, as it would be done with usual caching techniques known in prior art within a processor unit, step 520. Then the request is ready for execution, the queue pairs can be processed, step 530.

Thus, the invention represents a large step forward to a significantly increased performance in host adapter's work request handling because all transmission control information—which requires only small chip area compared to the total work request data contained in the queue pair—is available immediately where it is required: local to the host adapter. The rest of data which can be sent "through" the host adapter is stored external to the adapter/switching element because it does not carry any routing/switching information. Thus, a person skilled in the art will appreciate that the inventional concept can be scaled up and down easily with a small increase or decrease of required chip area needed for the local cache memory 20—according to the actual requirements present on a given hardware and traffic situation.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, the way in which the cache memory 20 is operated, can be varied to the different types known in the art, e.g., write back, or write through, etc.

What is claimed is:

1. A network coupling element comprising:
a local memory; and
control logic configured to:
responsive to an indication to copy transmission control information from a system memory on a CPU subsystem, determine if the local memory has enough free storage space to store the transmission control information;
responsive to a determination that there is enough free storage space to store the transmission control information:
store said transmission control information in the local memory; and
responsive to a determination that there is not enough free storage space to store the transmission control information:
conduct a cast-out/cast-in process in said local memory;
write a cast out entry back into an address in the system memory from said local memory by using a directory storing queue_air number with the address of the system memory;
store the transmission control information into the local memory by overwriting the cast out entry;
store an address and queue pair number of the transmission control information into the directory; and
use the transmission control information in the local memory to process address translation and protection tables.

2. The network coupling element according to claim 1, wherein the network coupling element comprises a Host Channel Adapter being configured to operate according to InfiniBand Architecture.

3. The network coupling element according to claim 1, wherein the network coupling element is configured to operate according to InfiniBand Architecture.

4. The network coupling element according to claim 3, wherein the transmission control information is bundled per queue or queue pairs.

5. The network coupling element according to claim 3, wherein the network coupling element is further configured to use said transmission control information for processing of completion queues.

6. The network coupling element according to claim 3, wherein the control logic is further configured to write said transmission control information to the local memory before signaling a completion of a InfiniBand verb.

7. The network coupling element according to claim 1, wherein the network coupling element comprises a Target Channel Adapter configured to operate according to InfiniBand Architecture.

8. The network coupling element according to claim 1, wherein the network coupling element is configured to connect at least one computer device to a network.

9. The network coupling element according to claim 1, wherein the control logic is further configured to not to discard from the local memory transmission control information for particular queues after casting-out.

10. A method comprising:
responsive to an indication to copy transmission control information from a system memory on a CPU subsystem, determining if a network coupling adaptor has enough free storage to store the transmission control information;
responsive to a determination that there is enough free storage to store the transmission control information:
storing said transmission control information in a local memory on the network coupling adaptor; and
responsive to a determination that there is not enough free storage to store the transmission control information:
conducting a cast-out/cast-in process in said local memory;
writing a cast out entry back into an address in the system memory from said local memory by using a directory storing queue pair number with the address of the system memory;
storing the transmission control information into the local memory by overwriting the cast out entry;
storing an address and queue pair number of the transmission control information into the directory; and
using the transmission control information in the local memory to process address translation and protection tables.

11. The method according to claim 10 further comprising the steps of using an InfiniBand Architecture.

12. The method according to the claim 11 wherein the transmission control information is bundled per queue or queue pairs.

13. The method according to claim 11 further comprising using said transmission control information for processing of completion queues.

14. The method according to claim 11 further comprising writing said transmission control information to the local memory before signaling a completion of a InfiniBand verb.

15. The method according to claim 10 further comprising the steps of using said local memory for connecting at least one computer device to a network.

16. The method according to claim 10 further comprising configuring said local memory not to discard transmission control information for particular queues after casting-out.

* * * * *